(12) United States Patent
Wei et al.

(10) Patent No.: US 8,829,802 B2
(45) Date of Patent: Sep. 9, 2014

(54) LED DIMMING CONTROL SCHEME

(75) Inventors: Qi Cui Wei, Hangzhou (CN); Zong Bing Li, Hangzhou (CN); Xiao Song, Hangzhou (CN); Da Feng Weng, Sunnyvale, CA (US)

(73) Assignee: Qi Cui Wei, Hangzhou (CN)

( * ) Notice: Subject to any disclaimer, the term of this patent is extended or adjusted under 35 U.S.C. 154(b) by 138 days.

(21) Appl. No.: 13/506,813

(22) Filed: May 18, 2012

(65) Prior Publication Data

US 2012/0306401 A1    Dec. 6, 2012

(30) Foreign Application Priority Data

Jun. 4, 2011    (CN) .......................... 2011 1 0150029

(51) Int. Cl.
*H05B 37/02*    (2006.01)
*H05B 37/00*    (2006.01)

(52) U.S. Cl.
CPC ............... *H05B 37/02* (2013.01); *Y02B 20/144* (2013.01); *Y02B 20/14* (2013.01)
USPC ........... 315/224; 315/308; 315/307; 315/276; 315/291

(58) Field of Classification Search
CPC ...................................................... H05B 37/02
USPC ......... 315/291, 224, 276, 250, 312, 294, 297, 315/308; 250/205; 702/66
See application file for complete search history.

(56) References Cited

U.S. PATENT DOCUMENTS

| | | | |
|---|---|---|---|
| 8,154,222 B2* | 4/2012 | Korsunsky et al. | |
| 8,587,212 B2* | 11/2013 | Li et al. ......................... | 315/250 |
| 2012/0112656 A1* | 5/2012 | Ryu et al. ...................... | 315/291 |
| 2012/0146539 A1* | 6/2012 | Riesebosch ................... | 315/291 |
| 2012/0169246 A1* | 7/2012 | Eddeane et al. .............. | 315/276 |
| 2012/0235585 A1* | 9/2012 | Lys et al. ................... | 315/200 R |

OTHER PUBLICATIONS

Author: Texas Intruments, Title: LM3445, Date Jan. 2009, Publish May 2013.*
Author: Texas Instruments, Title: LM3445 &LM3448, Date :Jan. 2009, Publish Sep. 2009.*

* cited by examiner

*Primary Examiner* — Douglas W Owens
*Assistant Examiner* — Wei Chan

(57) ABSTRACT

In order to keep the advantage of PWM dimming control scheme and make the LED driver high reliability and the LED lamp long lifetime, it is required that the frequency of PWM dimming control scheme is related with or the same as the output frequency of existed dimmers; and the output PWM dimming pulse is covered by the output pulse from dimmers further. The present invention discloses a novel "LED dimming control" scheme to make that the frequency of PWM dimming control scheme is related with or the same as the output frequency of dimmers; and the output PWM dimming pulse is covered by the output pulse from the dimmers further. In this way, it can guarantee that as PWM dimming pulse comes, the output from the dimmer can offer enough power to the LED driver and the LED driver can output the required LED driving current without flicker.

4 Claims, 3 Drawing Sheets

1--- Input of the dimming function block
2-- Output of the dimming function block

LED DIMMING CONTROL SCHEME

TECHNICAL FIELD

The present invention relates to line AC frequency and phase control. More particularly, the invention relates to a new control scheme to LED dimming and compatible with existed dimmers.

BACKGROUND OF THE INVENTION

In order to take the advantage of LED general lighting in energy saves and brightness regulating requirement from customer, it is necessary to use dimming technology in LED general lighting application. In offline LED dimming application, there are two kinds of most popular dimmers in the market. One is forward-phase dimmer (Triac dimmer); the other is reverse-phase dimmer (Transistor dimmer). The dimmer is used to control the input AC power of the LED lamp. The output of the dimmer includes both the supply power to LED lamp from the AC line and the dimming phase information.

For AC line dimmers, there are two kinds of dimming control schemes: analog dimming and PWM dimming methods.

For analog dimming, it picks up the pulse width information from the output of the dimmer and pass through a low-pass filter to get the related DC voltage signal. The DC voltage signal is proportion with the pulse width information from the output of the dimmer. The DC voltage signal is used to control the output current from a LED driver and to implement analog dimming. The advantage of analog dimming is simple and no output noise; the disadvantage is that there is color shift as the LED driving current decreases.

For forward-phase dimmer (Triac dimmer), there is minimum holding up current and it is related with the power level of the dimmer. The higher power is, the higher holding up current is in general. In analog dimming, as it is in deep dimming level, that is, low output LED driving current. It is possible to make the input current of the LED driver less than the required holding up current and it makes the conducting angle of Triac dimmer unstable and the output waveform unstable. It is the output of the dimmer unstable that makes the output current of the LED driver with jitter and the output light from the driven LED with flicker. Another issue with analog dimming is there is confliction between response capability and modulation related with line frequency.

For PWM dimming, it picks up the output pulse width information from the dimmer and processes the information and generates the related PWM signal to control the output duty-cycle of the LED driving current from the LED driver in order to change the output power. The advantage of the control scheme is that the output is a PWM signal and it only controls LED turn-on time and doesn't impact LED driving current amplitude. With the control scheme, due to LED driving current constant, it has less color shift issue. So far there are some PWM dimming scheme, e.g. National semiconductor's LM3445 proposal control scheme. It can output 400 Hz PWM control signal (it has no relation with the line frequency) to implement PWM dimming control scheme. In order to implement the control scheme, it requires that the input of LED driver has high enough input power or energy to output the related LED driving current. In general, to meet the requirement, it needs to add one or couple big electrolytic capacitors to store the energy to make sure that as PWM control signal comes, the input of the LED driver can offer the required power and the LED driver can output the related LED driving current.

In integrated LED lamp application, due to space limitation, the LED driver needs to operate under higher environment temperature. In order to keep high reliability of the LED driver and long lifetime of LED lamp, it hopes that there is no electrolytic capacitor in the LED driver due to the lifetime of electrolytic capacitor sensitive with the operating temperature.

In order to keep the advantage of PWM dimming control scheme and make the LED driver high reliability and the LED lamp long lifetime, it is required that the frequency of PWM dimming control scheme is related with or the same as the output frequency of dimmer; and the output PWM dimming pulse is covered by the output pulse from the dimmer further. In this way, it can guarantee that as PWM dimming pulse comes, the output from the dimmer can offer enough power to the LED driver and the LED driver can output the required LED driving current even there is jitter from the dimmer.

SUMMARY OF THE INVENTION

The present invention discloses a novel "LED dimming control" scheme to make that the frequency of PWM dimming control scheme is related with or the same as the output frequency of dimmer (for 50 Hz or 60 Hz AC line frequency, after the rectifier bridge, the frequency is 100 Hz or 120 Hz, so the frequency of PWM dimming control scheme is 100 Hz or 120 Hz); and the output PWM dimming pulse is covered by the output pulse from the dimmer further. In this way, it can guarantee that as PWM dimming pulse comes, the output from the dimmer can offer enough power to the LED driver and the LED driver can output the required LED driving current even there is jitter from the dimmer.

The control scheme is composed of a synchronized dimmer's PWM signal extract function block 1, a PWM signal processor function block 2 and a synchronized dimming PWM signal output function block 3. The synchronized dimmer's PWM signal extract function block 1, the PWM signal processor function block 2 and the synchronized dimming PWM signal output function block 3 are in turn connected. The synchronized dimmer's PWM signal extract function block 1 has an output directly as one input of the synchronized dimming PWM signal output function block 3.

The input frequency of the synchronized dimmer's PWM signal extract function block 1 is the same as the output frequency of the synchronized dimming PWM signal output function block 3, and the output pulse width from the synchronized dimming PWM signal output function block 3 is covered by the input dimmer's pulse width of the synchronized dimmer's PWM signal extract function block 1 (as shown in FIG. 7)

In the present invention discloses a novel "LED dimming control" scheme, (as shown in FIG. 2) the synchronized dimmer's PWM signal extract function block is composed of an AC zero cross detecting block 4, a dimmer's output pulse width detecting block 5, an AC synchronizing block 6 and a dimmer's output pulse phase calculating block 7. The dimmer's output pulse phase calculating block 7 receives all outputs from the AC zero cross detecting block 4, the dimmer's output pulse width detecting block 5 and the AC synchronizing block 6 respectively. One output from the AC zero cross detecting block 4 is also used as an input of the AC synchronizing block 6. The input of the synchronized dimmer's PWM signal extract function block is used as inputs for both the AC zero cross detecting block 4 and the dimmer's output pulse width detecting block 5.

The synchronized dimmer's PWM signal extract function block detects AC zero through the AC zero cross detecting block 4. The AC zero is used as the starting point of the phase measurement. With the starting point, the AC synchronizing block 6 generates a clock signal of multiples AC line frequency, and the dimmer's output pulse width detecting block 5 detects the starting point or ending point of input pulse from the dimmer forward-phase dimmer (Triac dimmer) or reverse-phase dimmer (Transistor dimmer)). The dimmer's output pulse phase calculating block 7 calculates and outputs a related phase value based on the starting or ending point of the phase measurement and the input pulse from forward-phase dimmer (Triac dimmer) or reverse-phase dimmer (Transistor dimmer). The related phase value is used as a sampled output value for the dimmer in the current cycle. The synchronized dimmer's PWM signal extract function block also outputs the clock signal of multiples AC line frequency and the correspondent phase starting or ending point of signal from forward-phase dimmer (Triac dimmer) or reverse-phase dimmer (Transistor dimmer).

In the present invention discloses a novel "LED dimming control" scheme, (as shown in FIG. 3) the PWM signal processor function block 2 is composed of an action of dimming or dimming output pulse width jitter judgment module 8, a dimming pulse width jitter cancellation judgment module 9 and an interference cancellation judgment module 10. The action of dimming or dimming output pulse width jitter judgment module 8, the dimming pulse width jitter cancellation judgment module 9 and the interference cancellation judgment module 10 are in turn connected. The output of interference cancellation judgment module 10 is feedbacked to the action of dimming or dimming output pulse width jitter judgment module 8. The output from the action of dimming or dimming output pulse width jitter judgment module 8 is an input of the synchronized dimming PWM signal output function block 3.

The input signal of the PWM signal processor function block 2 is one input of the action of dimming or dimming output pulse width jitter judgment module 8. Based on the output pulse width phase value from the synchronized dimmer's PWM signal extract function block 1, The PWM signal processor function block 2 makes a determination if it is the action of dimming or dimming output pulse width jitter. If it is the action of dimming, after interference cancellation, a new output pulse width value of the dimmer is stored and used as a reference value for next cycle.

In the present invention discloses a novel "LED dimming control" scheme, (as shown in FIG. 4) the synchronized dimming PWM signal output function block 3 is composed of a pulse width generator for power factor control 11, an output pulse width correcting circuit 12 and a synthesis circuit of dimming pulse width 13. The pulse width generator for power factor control 11 is connected with the synthesis circuit of dimming pulse width 13; the output pulse width correcting circuit 12 is connected with the synthesis circuit of dimming pulse width 13.

The output from the dimmer's output pulse phase calculating block 7 of the synchronized dimmer's PWM signal extract function block 1 is the input of the pulse width generator for power factor control 11; the output from the action of dimming or dimming output pulse width jitter judgment module 8 of the PWM signal processor function block 2 is used as the input of the output pulse width correcting circuit 12.

The synchronized dimming PWM signal output function block 3 (as shown in FIG. 1) bases on AC zero as a reference point to generate the related signal with power factor control issue and to increase the power factor of the LED driver. In the same time, the synchronized dimming PWM signal output function block 3 bases on the output phase value of the PWM signal processor function block 2 to output a synchronized PWM dimming signal. Due to process in the PWM signal processor function block 2, it can be guaranteed that the output pulse from the synchronized dimming PWM signal output function block 3 is covered by the output voltage waveform from the dimmer; and the output pulse is synthesized with the signal related of power factor control to output the final dimming pulse width.

In the present invention discloses a novel "LED dimming control" scheme in further detail (as shown in FIG. 5), the synchronized dimmer's PWM signal extract function block 1 is composed of an AC zero cross detecting block 14, an input dimmer detecting block 15, a phase lock loop circuit 16 and a dimming phase output block 17. The dimming phase output block 17 receives all outputs from the AC zero cross detecting block 14, the input dimmer detecting block 15, and the phase lock loop circuit 16 respectively. The output of the AC zero cross detecting block 14 is also used as an input of the phase lock loop circuit 16.

The PWM signal processor function block 2 is composed of a dimming phase memory module 18, a phase location judgment module 19, and a delay module 20. The dimming phase memory module 18, the phase location judgment module 19, and the delay module 20 are in turn connected. The output of the delay module 20 is feedbacked to the dimming phase memory module 18. The input of the dimming phase memory module 18 is used as an input of the PWM signal processor function block 2. One of output from the dimming phase memory module 18 is used as the output of the PWM signal processor function block 2.

The synchronized dimming PWM signal output function block 3 is composed of a fixed 120/150 degree pulse width generator 21, a no jitter pulse width circuit 22 and a dimming pulse output circuit 23. The fixed 120/150 degree pulse width generator 21 and the no jitter pulse width circuit 22 are connected with the dimming pulse output circuit 23 separately. The output of the PWM signal processor function block 2 is used as the input of the no jitter pulse width circuit 22. One of output from the synchronized dimmer's PWM signal extract function block 1 is used as the input of the fixed 120/150 degree pulse width generator 21.

The present invention of line frequency synchronized PWM method is focus on the existed popular dimmers. With the present invention, it can not only guarantee to regulate output power of LED without flicker but also save a big input capacitor.

The advantage of the present invention is to regulate LED driver's output with PWM control and keep the LED driving current amplitude constant. It is PWM dimming and there is no color shift in the light from LED lamp.

The advantage of the present invention is the instant LED driving current constant even at narrow output pulse from the dimmer. It is possible to make the input current of the LED driver over the holding up current of Triac dimmer and avoid the Triac dimmer misfire and flicker from LED lamp.

The advantage of the present invention is with power factor correction function but without extra circuit. It can down the total cost of the lighting system.

The advantage of the present invention is that the output pulse width from the control scheme is covered by the input dimmer's voltage pulse width and it is possible to save a big input capacitor and to reduce the cost and extend lifetime of LED driver.

The advantage of the present invention is without low-pass filter and the dimming response can be fast.

DETAIL DESCRIPTION OF THE INVENTION

Figure 1:
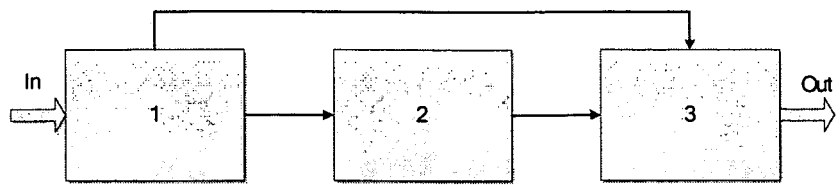
FIG. 1 is a present invention LED dimming control scheme's function block diagram
Figure 2:
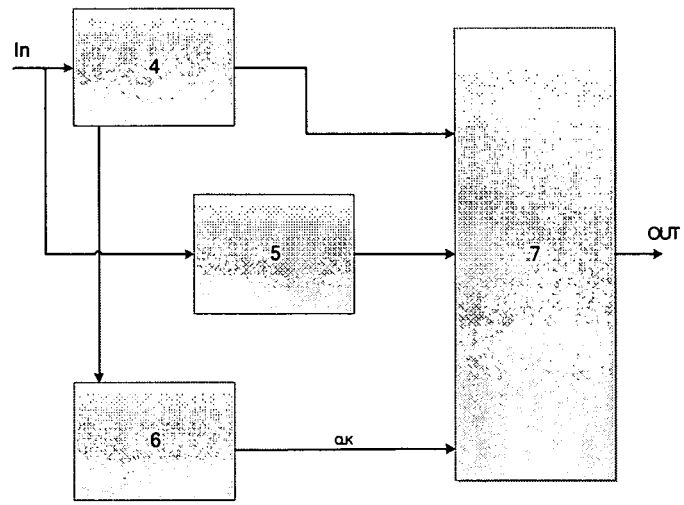
FIG. 2 is a module block diagram of the present invention LED dimming control scheme's synchronized dimmer's PWM signal extract function block
Figure 3:
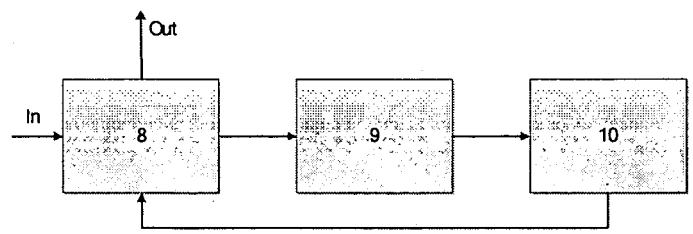
FIG. 3 is a module block diagram of the present invention LED dimming control scheme's PWM signal processor function block
Figure 4:
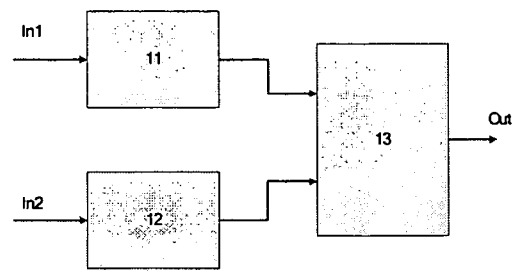
FIG. 4 is a module block diagram of the present invention LED dimming control scheme's synchronized dimming PWM signal output function block
Figure 5:
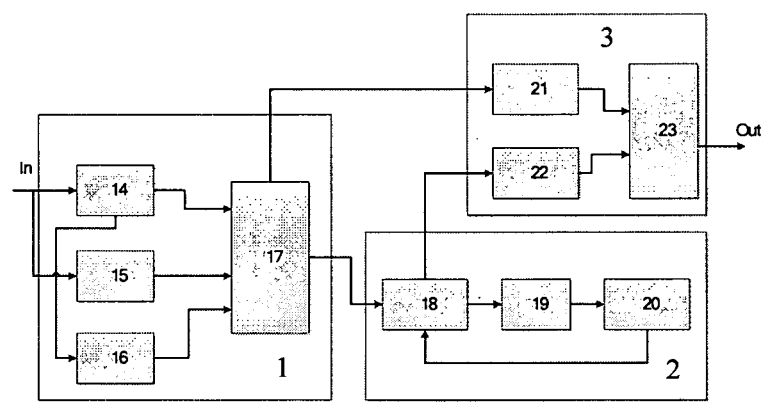
FIG. 5 is one of detailed embodiment of the "LED dimming control" scheme block diagram

FIG. 5 shows one detailed embodiment of invention scheme block diagram for LED Dimming Control Scheme. It is composed of a synchronized dimmer's PWM signal extract function block 1, a PWM signal processor function block 2 and a synchronized dimming PWM signal output function block 3.

The synchronized dimmer's PWM signal extract function block 1 is composed of an AC zero cross detecting block 14, an input dimmer detecting block 15, a phase lock loop circuit 16 and a dimming phase output block 17. The dimming phase output block 17 receives all outputs from the AC zero cross detecting block 14, the input dimmer detecting block 15 and the phase lock loop circuit 16 respectively. The output of the AC zero cross detecting block 14 is also as the input of the phase lock loop circuit 16.

The PWM signal processor function block 2 is composed of a dimming phase memory module 18, a phase location judgment module 19 and a delay module 20. The dimming phase memory module 18, the phase location judgment module 19 and the delay module 20 are in turn connected. The output of the delay module 20 is feedbacked to the dimming phase memory module 18. The one input of the dimming phase memory module 18 is used as the input of the PWM signal processor function block 2. One of output from the dimming phase memory module 18 is used as the output of the PWM signal processor function block 2.

The synchronized dimming PWM signal output function block 3 is composed of a fixed 120/150 degree pulse width generator 21, a no jitter pulse width circuit 22 and a dimming pulse output circuit 23. The fixed 120/150 degree pulse width generator 21 and the no jitter pulse width circuit 22 are connected with the dimming pulse output circuit 23 separately. The output of the PWM signal processor function block 2 is used as the input of the no jitter pulse width circuit 22. One of outputs from the synchronized dimmer's PWM signal extract function block 1 is used as the input of the fixed 120/150 degree pulse width generator 21.

The detail operation is as following:
1. The AC zero cross detecting block 14 is composed of a comparator; the comparator is used to detect the zero cross point of AC line. The comparator's inputs are connected with a lower voltage (e.g. 150 mV) and AC input voltage separately. The output of comparator is used as a signal for the phase counter's start point of the dimming phase output block 17 and the input synchronized signal of the phase lock loop (PLL) circuit 16. The phase lock loop (PLL) circuit 16 bases on the synchronized signal to generate a multi AC line frequency synchronized signal as the system operating clock. The input dimmer detecting block 15 is used to detect the start or end point of dimming input and shape and process the signal waveform. In real application, there are two kinds of dimmers, that is, forward-phase dimmer (Triac dimmer) and reverse-phase dimmer (Transistor dimmer). For forward-phase dimmer (Triac dimmer), the sampled point is at the end point. For reverse-phase dimmer (Transistor dimmer), the sampled point is at the start point. The AC zero cross detecting block 14, the input dimmer detecting block 15 and the phase lock loop (PLL) circuit 16 output processed signals into the dimming phase output block 17 and the dimming phase output block 17 takes care calculation and signal process. AC line input zero cross is taken as the starting point of a phase counter. The output clock from the phase lock loop (PLL) circuit 16 is used as the clock of the phase counter to count dimming input phase and get a digital data to represent input dimming phase information.

2. The dimming phase output block 17 will output the processed signal into dimming phase memory module 18 and the fixed 120/150 degree pulse width generator 21 separately. The signal will process in two different paths as following:

a) The dimming phase memory module 18 accepts the input signal and stores it. The dimming phase memory module 18 transmits the signal to the phase location judgment module 19. The phase location judgment module 19 is charged of judgment for jitter or dimming action. It can be done if the current cycle dimming input phase is around last cycle dimming input phase. Due to the function of the phase lock loop (PLL) circuit 16, the clock of the counter is multi AC line frequency. Phase judgment range can be in three clock cycles. Supposed the current line cycle input phase value is B and the previous phase value is A, it can make judgment that it is jitter if B is equal to A−1, A or A+1; otherwise, it is dimming. The phase location judgment module 19 will output the judgment signal to the delay module 20. The delay module 20 is used to judge if the output from the phase location judgment module 19 is a disturbing signal. It can be done by collecting multi line cycle's output from the phase location judgment module 19. If multi cycle's input phase values B aren't equal to A−1, or A or A+1 continuously, it is dimming action and the dimming phase memory module 18 will refresh the original stored A value with new input phase value B; otherwise, it is jitter and the dimming phase memory module 18 will keep original stored A value. The dimming phase memory module 18 accepts the feedback signal from the delay module 20 and transmits it into the no jitter pulse width circuit 22. The no jitter pulse width circuit 22 will generate a pulse width signal to the dimming pulse output circuit 23.

b) The fixed 120/150 degree pulse width generator 21 is charged of accepting zero cross signal and clock signal process. It will generate a fixed start point at 15° or 30° and fixed end point at 150° or 165° pulse width signal. The pulse width signal transmits to the dimming pulse output circuit 23. The dimming pulse output circuit 23 bases on two inputs from the fixed 120/150 degree pulse width generator 21 and the no jitter pulse width circuit 22 to generate no jitter dimming pulse width signal finally.

Figure 6:
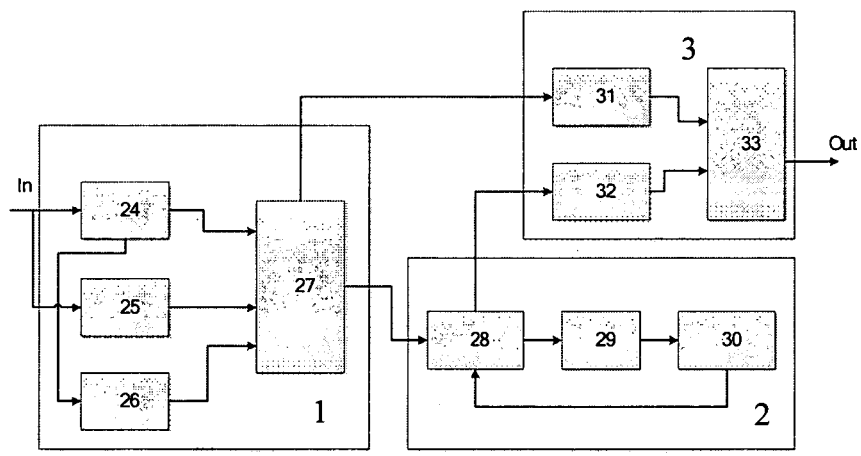
FIG. 6 is another of detailed embodiment of the "LED dimming control" scheme block diagram
Figure 7:
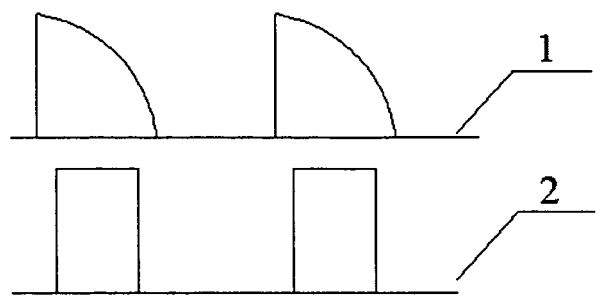
FIG. 7 is time domain waveforms of the input of the synchronized dimmer's PWM signal extract function block and the output of the synchronized dimming PWM signal output function block

FIG. 6 shows another detailed embodiment of invention scheme block diagram for LED Dimming Control Scheme. To compare FIG. 5, except the phase lock loop (PLL) circuit 16 is replaced with a synchronized multi frequency circuit 26, all other function blocks are the same. The synchronized multi frequency circuit 26 is used to count AC line cycle with a high frequency clock and to generate a synchronized fixed multi AC line frequency clock based on the counted AC line cycle value and AC zero cross point. The synchronized multi frequency circuit 26 has the same function as one of the phase lock loop (PLL) circuit 16 in FIG. 5. It is to generate a synchronized multi AC line frequency clock for the phase counter to count dimming input phase and get a digital data to represent the input dimming phase information.

The detail implement of FIGS. 5 and 6 are mix digital and analog circuits. It has several advantages over existed solutions. It is simple in circuit and strong in anti-jamming. It is easy to add additional function block to implement power factor control and decrease the total system cost. It is easy to modify the control parameters through adjustment of clock cycle number. It is easy to modify the range of phase location to increase the capability of the anti jitter function. It is easy to modify the delay time of the delay module 20 to increase the anti-jamming capability.

Finally, it is also important to note that only a number of specific embodiments of the present invention are listed above. Clearly, the present invention is not limited to the above embodiment and it can also have a lot of deformation. From the present invention discloses the contents, person of ordinary skill in this field can directly export or think of all the deformation, All deformation shall be deemed in the scope of protection of the present invention.

What is claimed is:

1. A LED dimming control system comprising: a synchronized dimmer PWM signal extract function module, a PWM signal processor function module and a synchronized dimming PWM signal output function module;
    wherein the synchronized dimmer PWM signal extract function module, the PWM signal processor function module and the synchronized dimming PWM signal output function module are in turn connected; and
    the synchronized dimmer PWM signal extract function module has an output directly connected to an input of the synchronized dimming PWM signal output function module; and
    a frequency of the synchronized dimmer PWM signal extract function module input is the same as one of a synchronized dimming PWM signal output function module output; and
    an output pulse width signal from the synchronized dimming PWM signal output function module is by the input dimmer pulse width signal of the synchronized dimmer PWM signal extract function module;
    wherein the synchronized dimmer PWM signal extract module comprises an AC zero cross detection module, an input dimmer detection module, a phase lock loop module and a dimming phase output module; wherein, the dimming phase output module receives all outputs from the AC zero cross detection module, the input dimmer detection module, and the phase lock loop module respectively; and
    the output of the AC zero cross detection module is also used as an input to the phase lock loop module; and
    wherein the PWM signal processor module comprises a dimming phase memory module, a phase location judgment module, and a delay module; and wherein,
    the dimming phase memory module, the phase location judgment module, and the delay module are in turn connected; and
    wherein an output of the delay module feedbacks information to the dimming phase memory module; and
    an input of the dimming phase memory module is used as an input of the PWM signal processor module; and
    one of the outputs from the dimming phase memory module is used as the output of a PWM signal processor module; and
    the synchronized dimming PWM signal output function module comprises a fixed 120/150 degree pulse width generator, a no jitter pulse width circuit and a dimming pulse output module; and
    wherein the fixed 120/150 degree pulse width generator and the no jitter pulse width are connected with the dimming pulse output module separately; and
    an output of PWM signal processor module is used as an input to the no jitter pulse width module; and
    one of output from a synchronized dimmer PWM signal extract function module is used as the input to the fixed 120/150 degree pulse width generator module.

2. A LED dimming control scheme of claim 1, wherein the synchronized dimmer PWM signal extract function module comprises an AC zero cross detecting module, a dimmer output pulse width detecting module, an AC synchronizing module and a dimmer output pulse phase calculating module; wherein the dimmer output pulse phase calculating module receives all outputs from the AC zero cross detecting module, the dimmer output pulse width detecting module, and the AC synchronizing module respectively; and one output from the AC zero cross detecting module is also an input of the AC synchronizing module; and the input of the synchronized dimmer PWM signal extract function module is used as the input to the AC zero cross detecting module and the dimmer output pulse width detecting module.

3. A LED dimming control scheme of claim 1, wherein the PWM signal processor function module comprises an dimming output pulse width jitter judgment module, a dimming pulse width jitter cancellation judgment module and an interference cancellation judgment module; wherein the dimming output pulse width jitter judgment module, the dimming pulse width jitter cancellation judgment module and the interference cancellation judgment module are in turn connected; and an output of the interference cancellation judgment module feedbacks information to the dimming output pulse width jitter judgment module; and an output from the dimming output pulse width jitter judgment module; and the output from the action of dimming or the dimming output pulse width jitter judgment module is one input of the synchronized dimming PWM signal output function module.

4. A LED dimming control scheme of claim 1, wherein the synchronized dimming PWM signal output function module comprises a pulse width generator for power factor control module, an output pulse width correcting module, and a synthesis circuit of dimming pulse width; wherein the pulse width generator for power factor control module is connected with the synthesis module of dimming pulse width module; and the output pulse width correcting module is connected with a synthesis circuit of dimming pulse width.

* * * * *